UNITED STATES PATENT OFFICE 2,536,976

ALKYLATION OF ARYL GLYCOL ETHERS

James M. Cross, Washington, and Max E. Chiddix, Phillipsburg, N. J., assignors to General Aniline & Film Corporation, New York, N. Y., a corporation of Delaware No Drawing. Application September 11, 1947, Serial No. 773,500

14 Claims. (Cl. 260—613)

This invention relates to the process of alkylating aryl glycol ethers of the formula:

$$Ar\text{—}O\text{—}(CHR\text{—}CHR\text{—}O)_nH$$

wherein $n$ is an integer from 1 to 20 and preferably from 1 to 10, Ar is aryl (i. e. a mono- or bicyclic hydrocarbon radical which may or may not be substituted with a hydrocarbon radical) and the R's are hydrogen or lower alkyl (i. e. methyl or ethyl).

These glycol ethers of alkylated phenols are well known in the art and have found extensive use therein. The monoglycol ethers and those polyglycol ethers in which the ether radical contains a relatively small number of alkanoxy groups are oil-soluble and many of them are valuable insecticides. Also, the terminal hydroxyl group of the ether radical may be replaced by a sulfonic acid group; for instance, by treatment with sulfamic acid, and the alkali metal salts of such sulfamic acids are valuable surface active agents. As the number of ethanoxy groups in the ether radical is increased, the products become water-soluble and are valuable, widely-used, non-ionic surface active agents.

These glycol ethers of alkyl phenols have heretofore been produced by etherifying an alkyl phenol, for instance by condensation of ethylene oxide or treatment with epichlorhydrin, etc. or from the standpoint of complete synthesis the phenol, cresol or naphthol has first been alkylated and the thus-obtained alkylated phenol has then been etherified. It has now been found that these glycol ethers of alkyl phenols may be produced by alkylating a glycol ether of phenol, cresol or naphthol and by effecting this alkylation in the manner hereinafter described, it is frequently possible to synthesize these glycol ethers of alkyl phenols more economically and in better yield from the basic raw materials (i. e. phenol, alkylating agent and etherifying agent) than was possible by the methods heretofore employed in the art.

Briefly stated, the process of the present invention involves treating an aryl glycol ether with an alkylating agent (i. e. olefine or alcohol) in the presence of sulfuric acid as the condensing agent. While the reaction may be carried out at temperatures of from 0° C. to 100° C., it has been found that the best results are obtained when a temperature within the range of from 20° C. to 70° C. is employed.

The relative proportions of the alkylating agent and the aryl glycol ether employed as the reactants in practicing the process of the present invention can be varied within the range of ±20% of the amount theoretically required to prepare the desired alkylated aryl glycol ether; however, it is desirable for best results to employ some excess of the alkylating agent. Generally, about 5% to 10% excess of the alkylating agent is employed in practicing the present invention. Thus, when it is desired to introduce only a single alkyl substituent into the aryl glycol ether, about 1 to 1.1 mols of alkylating agent will be employed for each mol of ether, while about 2 to 2.2 mols of alkylating agent per mole of ether will be employed when it is desired to produce dialkyl substituted aryl glycol ethers from an unsubstituted aryl glycol ether. The process of this invention is valuable for producing of mono- or dialkylated aryl glycol ethers. When it is desired to produce dialkylated aryl glycol ethers in which two different alkyl groups are present as substituents, an unsubstituted aryl glycol ether is first alkylated with about 1 to 1.1 mols of a second alkylating agent corresponding to one of the desired substituents and the thus-obtained monoalkyl product is then alkylated with about 1 to 1.1 mols of a second alkylating agent corresponding to the second desired alkyl substituent. As described specifically in some of the examples given below, the dialkyl product which is thus obtained consists largely of a dialkylated aryl glycol ether in which two different alkyl groups are present as substituents and contains only minor amounts of dialkylated product in which the two alkyl groups are the same, and is of satisfactory quality without purification for technical uses where dialkylated aryl glycol ethers, in which the two alkyl groups are different, are desired.

Sulfuric acid has been found to be noticeably superior to other condensing agents and is therefore employed as the condensing agent for alkylating aryl glycol ethers in accordance with this invention. The sulfuric acid which is employed as the condensing agent should range from 70% to 100% sulfuric acid and preferably should be of at least 80% concentration when an olefine is used as the alkylating agent and preferably of at least 93% concentration when an alcohol is used as the alkylating agent. At least 0.5 mol of sulfuric acid should be employed per mol of ether. However, it has been found that the highest yields are obtained if at least one mol of sulfuric acid is employed per mol of ether. Furthermore, if the glycol ether contains one alkanoxy group (i. e. where $n$ in the above formula is 1) one mol of sulfuric acid is preferable.

Similarly, as the number of alkanoxy groups in the ether radical (i. e. $n$ in the above formula) increases between two and six, the molar ratio of sulfuric acid to ether should be increased as the number of alkanoxy groups in the molecule is increased. However, as the number of such alkanoxy groups in the ether radical increases above six, no noticeable advantage has been found in using more than six mols of sulfuric acid per mole of ether.

The aryl glycol ethers which are alkylated in accordance with this invention may be exemplified by the mono- and polyglycol ethers of mono- and bicyclic phenols, such as phenol, cresol, $\alpha,\beta$-naphthols, etc. It has also been found that the process of the present invention is particularly valuable in the production of alkylated aryl glycol ethers which contain two alkyl groups of four or more carbon atoms in the benzene ring. It is therefore contemplated that the process of the present invention may be employed for the introduction of a second alkyl group into the benzene ring of an aryl glycol ether which already contains one alkyl substituent of at least three carbon atoms and these alkylated aryl glycol ethers may be exemplified by the mono- and polyglycol ethers of such alkyl phenols as isopropyl phenol, n-butyl phenol, isobutyl phenol, tert.-butyl phenol, isoamyl phenol, tert.-amyl phenol, isohexyl, phenol, isooctyl-$\beta$-naphthol, octadecyl phenol, o- and p-phenyl phenols, etc.

The aryl glycol ethers which are alkylated in accordance with the present invention are well known in the art, and since satisfactory methods for their production are also available and well known and do not form a part of the present invention, they will not be described in detail here. Suitable processes for the production of these aryl glycol ethers are, for instance, condensing a phenol with an alkylene oxide, a polyglycol ether, or ethylene chlorohydrin as described, for example, in U. S. Patent No. 1,970,578 or U. S. Patent No. 2,158,958.

Alkylating agents suitable for use in the present process include olefines and alcohols. Examples of olefines of the aliphatic or cycloaliphatic series, especially those where the double bond is present in a tertiary bound carbon atom, are, for instance, propylene, butylenes, amylenes, hexylenes, heptylenes, octylenes, nonylenes, decylenes, dodecylenes, octadecylenes, etc. and mixtures of these compounds. Furthermore, there are suitable olefines of high molecular weight formed by polymerization of olefines of low molecular weight and such as are obtained by different technical processes, for instance, by the cracking of paraffines or of products of the distillation of mineral oils or of hydrogenation products of coal or carbon oxide; furthermore, olefines formed, for instance, by dehydrating alcohols or alcohol mixtures obtained by reduction of natural fatty, resinic and ceric acids. There may also be used the dehydration products of the alcohols obtained by oxidizing paraffine. As alcohols which may be caused to react with the aryl glycol ethers, there may be named the following: the aliphatic primary, secondary and tertiary alcohols, such as isopropyl alcohol, isobutyl alcohol, tertiary-butyl alcohol, tertiary-amyl alcohol, undecyldimethylcarbinol, the alcohols or alcohol mixtures obtainable by reduction of natural fatty, ceric and resinic acids; naphthene alcohols, hydrogenated aromatic hydroxy compounds, for instance, cyclohexanol, the methylcyclohexanols, and the alcohols obtained by hydrogenating carbon monoxide.

The details of the present invention will be apparent to those skilled in the art from a consideration of the following specific examples of preferred embodiments thereof. The parts are by weight.

*Example 1*

To a glass reactor fitted with a stirrer, thermometer, calcium chloride tube and dropping funnel was added 138 parts (1 mol) of phenoxyethanol and 105.4 parts (1 mol) of cold 93% sulfuric acid while stirring and maintaining the temperature within the range of 20–25° C. To this mixture was added 134.4 parts (2.4 mols) of isobutylene while maintaining the gas in the reaction vessel under a pressure of 12 cm. of mercury during a period of 3½ hours. After stirring the reaction mixture for an additional 1½ hours at 25–35° C., 100 parts of water were added and the mixture stirred and heated under reflux for ½ hour. The layers were then allowed to separate and the lower layer consisting of a mixture of water and sulfuric acid was separated and the reaction mixture again washed with water. The last traces of sulfuric acid were removed from the reaction product by washing with 5% aqueous sodium bicarbonate solution. The reaction product was then separated, dried and distilled. There was thus obtained 220.4 parts (88% of the theoretical) of di-tertiary butylphenoxy ethanol boiling at 162–170° C./12 mm. and melting at 62–64° C.

When phenol was substituted for phenoxyethanol in the above experiment, there was obtained a mixture of mono- and di-tertiary butyl phenols in a yield of only 63% of the theoretical.

In an attempt to alkylate benzyloxyethanol in accordance with the procedure described above, little or no product was obtained. The main product isolated was a mixture of di- and tri-isobutylene boiling at 92–100° C. at atmospheric pressure.

*Example 2*

To an apparatus similar to that described in Example 1, there was added 55 parts (0.4 mol) of phenoxyethanol and 39.8 parts (0.4 mol) of 98.4% sulfuric acid during the course of about 11 minutes, while stirring and maintaining the temperature of the reaction mixture at approximately 5° C. To this mixture was added 77.5 parts (0.88 mol) of tertiary-amyl alcohol while maintaining the temperature within the range of 5–10° C. during a period of 1 hour. An additional 39.8 parts of 98.4% sulfuric acid was then added and the mixture heated at 45–55° C. for 4 hours. To this mixture was added 80 parts of water and the mixture heated to boiling for ½ hour. The layers were then allowed to separate and the lower layer, which consisted of a mixture of sulfuric acid and water, was removed and the washing operation repeated. The upper layer was finally neutralized by washing with a 5% aqueous sodium carbonate solution. The reaction product was then separated and distilled to obtain 98.3 parts (89% of the theoretical) of di-tertiary-amyl phenoxyethanol boiling at 139–157° C./2 mm.

*Example 3*

To a stainless steel reactor similar to that described in Example 1 was added 277 parts (2 mols) of phenoxyethanol and 176 parts (2 mols) tertiary-amyl alcohol. To this mixture was added 274 parts (2.6 mols) of 93% sulfuric acid, while stirring and maintaining the reaction temperature at 25–30° C. during the course of 1 hour. The mixture was then heated at 45–50° C. for 3 hours. To this resultant product was then added 140 parts (2.5 mols) of isobutylene while maintaining the reaction mixture under a pressure of 12 cm. of mercury during the course of about 1 hour. The viscous solution was then stirred at 45–50° C. for an additional hour and then washed with water to remove the sulfuric acid. After the removal of the last traces of sulfuric acid by washing with a 5% aqueous solution of sodium carbonate, the reaction product was distilled to obtain 497 parts (94% of the theoretical) of a mixture of tertiary-amyl-tertiary-butyl phenoxyethanol and some di-tertiary-amyl phenoxyethanol and some di-tertiary butyl-phenoxy ethanol boiling at 150–190° C./5 mm.

*Example 4*

To a reaction vessel similar to that described in Example 1 was added 151.7 parts (0.315 mol) of polyethylene glycol monophenyl ether containing an average of 8.7 units of ethylene oxide per molecule and 189.6 parts (1.8 mols) of 93% sulfuric acid while maintaining the temperature of the reaction mixture at 25–35° C. To this mixture was added 33.7 parts (0.3 mol) of di-isobutylene while maintaining the reaction mixture within the range of 0–5° C. The reaction mixture was then stirred for an additional hour while the temperature increased to about 25° C. After stirring for 16 hours at 25–35° C., there was added 300 parts of a 20% aqueous sodium chloride solution and the mixture stirred and heated under reflux for ½ hour. The layers were allowed to separate and the mixture was again washed with a 10% sodium chloride solution and the layers separated. The excess sulfuric acid was removed by treatment with an aqueous 5% sodium hydroxide solution and the layers separated. After drying the reaction product, there was obtained 170.7 parts (96% of the theoretical) of octyl-phenyl ether of polyethylene glycol.

*Example 5*

To the reaction vessel similar to that described in Example 1 was added 59.3 parts (0.3 mol) of diethylene glycol monophenyl ether and 63.2 parts (0.6 mol) of 93% sulfuric acid. To this mixture was added 33.5 parts (0.3 mol) of di-isobutylene while maintaining the temperature at 10° C. The reaction mixture was then stirred for 16 hours while maintaining the temperature within the range of 25–30° C. The reaction product was then repeatedly washed with water and finally with a 5% sodium carbonate solution to remove last traces of acid. Upon distillation, there was obtained 79.1 parts (85% of the theoretical) of actylphenoxyethoxyethanol.

*Example 6*

Using the general procedure outlined in the previous examples, 83.2 parts (0.4 mol) of amyl-phenoxy ethanol, 49 parts (0.4 mol) of 80% sulfuric acid and 27.6 parts (0.49 mol) of iso-butylene were reacted while maintaining the temperature at 25–30° C. After stirring the solution for 16 hours at room temperature and then ½ hour at 45–50° C., the reaction product was repeatedly washed with water and finally with a 5% aqueous sodium carbonate solution to remove the sulfuric acid. There was thus obtained 100.7 parts (95.5% of the theoretical) of tertiary-amyl-tertiary-butyl phenoxyethanol boiling at 152–172° C./4 mm.

*Example 7*

Using the same procedure as outlined in the previous examples, 47.5 parts (0.3 mol) of o-toloxyethanol was reacted with 31.4 parts (0.315 mol) of 98.4% sulfuric acid and 35.3 parts (0.315 mol) of di-isobutylene for 16 hours, while maintaining the reaction temperature at 25–30° C. After washing the reaction product repeatedly with water and finally with an aqueous sodium carbonate solution to remove the sulfuric acid, there was obtained 81.7 parts (100% of the theoretical) of methyloctyl-phenoxyethanol.

We claim:

1. The process of alkylating β-hydroxy-ethyl ether of phenol which comprises reacting said ether with an equivalent amount of olefine in the presence of at least an equimolar amount of sulfuric acid of at least 80% strength and at a temperature of 20° to 70° C.

2. The process of alkylating β-hydroxy-ethyl ether of phenol which comprises reacting said ether with an equivalent amount of an aliphatic alcohol in the presence of at least an equimolar amount of sulfuric acid of at least 93% strength and at a temperature of 20° to 70° C.

3. The process of producing β-hydroxy-ethyl ethers of dialkyl phenols, wherein the said alkyl groups are different, which comprises reacting a β-hydroxy-ethyl ether of an unsubstituted phenol with about one mol of an alkylating agent selected from the group consisting of olefines and aliphatic alcohols in the presence of about one mol of sulfuric acid of at least 80% strength per mol of said ether and at a temperature of from 20° to 70° C. to produce a β-hydroxy-ethyl ether of a monoalkyl phenol, and reacting the thus-obtained monoalkyl ether with an equivalent amount of a second and different alkylating agent selected from the group consisting of olefines and aliphatic alcohols in the presence of about an equimolar amount of sulfuric acid of at least 80% strength and at a temperature of from 20° to 70° C.

4. The process of producing β-hydroxy-ethyl ethers of dialkyl phenols which comprises reacting a β-hydroxy-ethyl ether of a monoalkyl phenol with about an equivalent amount of an olefine in the presence of an equimolar amount of sulfuric acid of at least 80% strength and at a temperature of from 20° to 70° C.

5. The process of producing β-hydroxy-ethyl ethers of dialkyl phenols which comprises reacting a β-hydroxy-ethyl ether of a monoalkyl phenol with about an equivalent amount of an aliphatic alcohol in the presence of an equimolar amount of sulfuric acid of at least 93% strength and at a temperature of from 20° to 70° C.

6. The process of producing alkylated aryl glycol ethers, which comprises reacting an aryl glycol ether of the formula:

wherein $n$ is an integer and R is a member of the group consisting of hydrogen and alkyl with at least an equivalent amount of an alkylating agent selected from the group consisting of olefines and aliphatic alcohols at a temperature of from 20–70° C. and in the presence of sulfuric acid of at least 80% strength, the molar amount of said sulfuric acid employed per mol of said ether corresponding substantially to the value of $n$ when $n$ is between 1 and 6, and being about 6 mols of sulfuric acid per mol of said ether when $n$ is greater than 6.

7. The process of producing alkylated aryl glycol ethers, which comprises reacting an aryl glycol ether of the formula:

$$\text{Aryl}-(\text{OCH}_2-\text{CH}_2)_n\text{OH}$$

wherein $n$ is an integer, with at least an equivalent amount of an alkylating agent selected from the group consisting of olefines and aliphatic alcohols at a temperature of from 20–70° C. and in the presence of sulfuric acid of at least 80% strength, the molar amount of said sulfuric acid employed per mol of said ether corresponding substantially to the value of $n$ when $n$ is between 1 and 6, and being about 6 mols of sulfuric acid per mol of said ether when $n$ is greater than 6.

8. The process as defined in claim 7, wherein the alkylating agent is a tertiary olefine.

9. The process as defined in claim 7, wherein the alkylating agent specified is a tertiary aliphatic alcohol and the sulfuric acid specified is of at least 93% strength.

10. The process of producing dialkyl aryl glycol ethers, which comprises reacting an unsubstituted aryl glycol ether of the formula:

$$\text{Aryl}-(\text{OCH}_2-\text{CH}_2)_n\text{OH}$$

wherein $n$ is an integer, with slightly more than two mols per mol of said ether of an alkylating agent selected from the group consisting of olefines and aliphatic alcohols at a temperature of from 20–70° C. in the presence of sulfuric acid of at least 80% strength, the molar amount of said sulfuric acid employed per mol of said ether corresponding substantially to the value of $n$ when $n$ is between 1 and 6 and being about 6 mols of sulfuric acid per mol of said ether when $n$ is greater than 6.

11. The process of producing dialkyl aryl glycol ethers, which comprises reacting an unsubstituted alkyl aryl glycol ether of the formula:

$$\text{Aryl}-(\text{OCH}_2-\text{CH}_2)_n\text{OH}$$

wherein $n$ is an integer, with about one mol of a tertiary aliphatic alcohol at a temperature of from 20–70° C. and in the presence of sulfuric acid of at least 93% strength, the molar amount of said sulfuric acid employed per mol of said ether corresponding substantially to the value of $n$ when $n$ is between 1 and 6, and being about 6 mols of sulfuric acid per mol of said ether when $n$ is greater than 6, to thereby obtain a monoalkyl glycol ether, and reacting the thus obtained monoalkyl glycol ether with an equivalent amount of a tertiary olefine at a temperature of from 20–70° C. and in the presence of sulfuric acid of at least 80% strength, the amount of said sulfuric acid employed per mol of said monoalkyl ether corresponding substantially to the value of $n$ when $n$ is between 1 and 6 and being about 6 mols of sulfuric acid per mol of said ether when $n$ is greater than 6.

12. The process of producing dialkyl aryl glycol ethers, which comprises reacting an unsubstituted alkyl glycol ether of the formula:

$$\text{Aryl}-(\text{OCH}_2\text{CH}_2)_n\text{OH}$$

wherein $n$ is an integer, with about one mol of an alkylating agent selected from the group consisting of olefines and aliphatic alcohols at a temperature of from 80–70° C. and in the presence of sulfuric acid of at least 80% strength, the molar amount of said sulfuric acid employed per mol of said ether corresponding substantially to the value of $n$ when $n$ is between 1 and 6 and being about 6 mols of sulfuric acid per mol of said ether when $n$ is greater than 6, and reacting the thus obtained monoalkyl glycol ether with a substantially equivalent further amount of an alkylating agent selected from the group consisting of olefines and aliphatic alcohols at a temperature of from 20–70° C. and in the presence of sulfuric acid of at least 80% strength, the molar amount of said sulfuric acid employed per mol of said monoalkyl ether corresponding substantially to the value of $n$ when $n$ is between 1 and 6 and being about 6 mols of sulfuric acid per mol of said ether when $n$ is greater than 6.

13. The process as defined in claim 12, wherein the alkyl groups introduced into said ether are structurally different and structurally different alkylating agents are employed in the two alkylating steps specified.

14. The process of producing dialkyl aryl glycol ethers, which comprises reacting a monoalkyl aryl glycol ether of the formula:

$$\text{Aryl}-(\text{OCH}_2-\text{CH}_2)_n\text{OH}$$

wherein $n$ is an integer, with a substantially equivalent amount of an alkylating agent selected from the group consisting of olefines and alcohols at a temperature of from 20–70° C. and in the presence of sulfuric acid of at least 80% strength, the molar amount of said sulfuric acid employed per mol of said ether corresponding substantially to the value of $n$ when $n$ is between 1 and 6 and being about 6 mols of sulfuric acid per mol of said ether when $n$ is greater than 6.

JAMES M. CROSS.
MAX E. CHIDDIX.

REFERENCES CITED

The following references are of record in the file of this patent:

UNITED STATES PATENTS

| Number | Name | Date |
|---|---|---|
| 1,987,228 | Bruson | Jan. 8, 1935 |
| 2,008,032 | Niederl | July 16, 1935 |
| 2,168,349 | Kyrides | Aug. 9, 1939 |

Certificate of Correction

Patent No. 2,536,976 January 2, 1951

JAMES M. CROSS ET AL.

It is hereby certified that error appears in the printed specification of the above numbered patent requiring correction as follows:

Column 2, line 22, strike out the word "second"; column 8, line 12, for "80–70° C." read *20–70° C.*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*